(12) United States Patent
Mead

(10) Patent No.: US 6,620,369 B1
(45) Date of Patent: Sep. 16, 2003

(54) NET MOLDING OF RESIN COMPOSITE PARTS

(75) Inventor: William T. Mead, Irvine, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/501,037

(22) Filed: Feb. 9, 2000

(51) Int. Cl.$^7$ .............................................. B29C 70/44
(52) U.S. Cl. ........................ 264/409; 264/138; 264/152; 264/153; 264/510; 264/511; 264/257; 264/258; 264/318; 264/324; 264/482
(58) Field of Search ................................ 264/138, 152, 264/510, 511, 318, 409, 482, 153, 257, 258, 324

(56) References Cited

U.S. PATENT DOCUMENTS

| | | | |
|---|---|---|---|
| 4,065,340 A | | 12/1977 | Dickerson |
| 4,267,142 A | | 5/1981 | Lankheet |
| 4,867,085 A | * | 9/1989 | Brace et al. ............. 112/262.1 |
| 4,908,494 A | * | 3/1990 | Faiz et al. ............. 218/121.72 |
| 4,942,013 A | | 7/1990 | Palmer et al. |
| 5,009,104 A | * | 4/1991 | Johnson ........................ 73/597 |
| 5,041,260 A | * | 8/1991 | Johnson et al. ............. 264/510 |
| 5,067,086 A | * | 11/1991 | Yamazaki et al. ..... 364/474.08 |
| 5,106,568 A | * | 4/1992 | Honka ......................... 264/510 |
| 5,129,813 A | | 7/1992 | Shepherd |
| 5,131,834 A | | 7/1992 | Potter |
| 5,217,766 A | * | 6/1993 | Flonc et al. ................ 428/34.5 |
| 5,229,141 A | * | 7/1993 | Mozer .......................... 264/257 |
| 5,236,646 A | * | 8/1993 | Cochran et al. ............. 264/102 |
| 5,246,520 A | * | 9/1993 | Scanlon et al. ............. 156/245 |
| 5,281,388 A | | 1/1994 | Palmer et al. |
| 5,348,602 A | | 9/1994 | Makarenko et al. |
| 5,527,414 A | | 6/1996 | Dublinski et al. |
| 5,538,769 A | * | 7/1996 | Sandman, Jr. ............. 428/36.3 |
| 5,576,030 A | | 11/1996 | Hooper |
| 5,601,852 A | | 2/1997 | Seemann |
| 5,665,301 A | | 9/1997 | Alanko |
| 5,683,646 A | | 11/1997 | Reiling, Jr. |
| 5,817,265 A | * | 10/1998 | Gendreau .................... 264/138 |
| 5,827,392 A | * | 10/1998 | Buckley et al. .......... 156/275.3 |
| 5,885,513 A | | 3/1999 | Louderback et al. |
| 5,926,388 A | * | 7/1999 | Kimbrough et al. ... 364/468.25 |
| 6,017,484 A | * | 1/2000 | Hale ........................... 264/510 |
| 6,110,262 A | * | 8/2000 | Kircher et al. ........... 106/14.44 |
| 6,174,392 B1 | * | 1/2001 | Reis ............................. 156/58 |
| 6,214,279 B1 | * | 4/2001 | Yang et al. ................. 264/482 |

FOREIGN PATENT DOCUMENTS

EP   0 470 901 A1   *   2/1992

* cited by examiner

Primary Examiner—Stefan Staicovici
(74) Attorney, Agent, or Firm—Stetina, Brunda, Garred & Brucker

(57) ABSTRACT

A method of forming a resin composite part utilizing a mold surface for mitigating post-cure machining of the resin composite part. The method provides for forming a resin preform having a peripheral geometry similarly sized and configured as a configuration of the mold surface. The mold surface is sized and configured to receive the resin preform. The resin preform is then cured to form the resin composite part with the resin composite part being confirmed to the configuration of the mold surface for mitigating post-cure machining of the resin composite part.

35 Claims, 5 Drawing Sheets

NET MOLDING OF RESIN COMPOSITE PARTS

BACKGROUND OF THE INVENTION

The present invention generally relates to a method and an apparatus for forming a resin composite part, and more particularly to an improved method and apparatus for forming a resin a composite part utilizing a mold surface for mitigating post-cure machining of the resin composite part.

The use of composite material in commercial and military applications is well known. Composite materials are desirable due to their mechanical characteristics such as a high strength to weight ratio and high thermal tolerances. As such, composite materials are frequently used to build structural supports, such as ducts for aircrafts.

Because of their high strength coupled with light weight, composite parts are being increasingly utilized as structural components in a variety of articles. Typical composite part material includes glass or graphite fibers that are embedded in resins such as epoxy, phenolic or bismaleimide resins. Generally, the fiber and resin are "laid-up" over a mold and then cured under elevated temperature, and pressure. Composite parts destined to be used in the aerospace or aircraft industries must meet exacting requirements as to their structural integrity. To meet these exacting requirements, precise control of temperature and pressure conditions is required during their cure.

A widely utilized system for forming structure composite parts uses what are termed "prepregs." These are sheets of fiber that have uncured resin embedded therein. The prepreg is laid over the mold and while being maintained in position against the mold, it is subjected to heat and pressure to cure the prepreg into the composite material. Various apparatus are known to maintain the prepreg in contact with the mold during heat and pressure treatment such as press platens, vacuum bags or trapped rubber molding systems.

However, prepregs are expensive, its shelf life is limited, and it must normally be kept refrigerated until used. In addition, special handling safety procedures are necessary when handling uncured resin impregnated fibers.

This has led to the use of processes that do not require such "prepregs." These processes are similar in that fibers are still laid-up in a mold, however it is initially resin free. The lay-up is subsequently vacuum bagged, and a vacuum is drawn from between the bag and mold such that the lay-up is compressed by atmospheric against the mold. However, in this process, resin is simultaneously drawn in through an inlet port in the vacuum bag and through the lay-up impregnating it. Finally the now impregnated fibers are heated until the resin is cured.

As shown in FIGS. 1 and 2, regardless of using processes that include prepregs or not, one factor remains the same. The final cured product, namely, cured resin composite part, needs to be trimmed. More specifically, whether the process involves prepregs, or not, the resin composite part resulting therefrom has to be trimmed to the desired engineering specifications.

Such trimming of the resin composite part frequently occurs at the end of its manufacturing process. In particular, the resin composite part is formed first before meeting its dimensional specifications, in which such specifications are only met thereafter to achieve its practical applicability. In the industry that utilizes such step, the trimming is typically done by expensive machines, thereby becoming an inevitable obstacle to cost-saving and efficient manufacturing.

The resin composite part is often subjected to 5-axis machining to meet the engineering specifications desired by manufacturers. More specifically, 5-axis machining is utilized not only for trimming, but for drilling as well. As indicated in the immediate paragraph above, such machines to carry out the functions of 5-axis machining are expensive, simultaneously being essential components in the overall manufacturing of resin composite parts.

Moreover, the materials employed to form the resin composite part are costly as well. In the industry where such resin composite parts are often mass-produced, any material that is trimmed or machined from each cured product may prove to be significant when added together. In view of today's manufacturing process for forming resin composite parts, the excess materials resulting therefrom may be inescapable, ultimately having to be exposed to post-cure machining such as 5-axis machining.

Thus, there has long been a need in the industry, and in the aerospace industry in particular for a method and an apparatus for forming a resin composite part utilizing a mold surface in order to mitigate post-cure machining of the resin composite part. In particular, there is a need to manufacture resin composite parts without performing post-cure machining of excess materials resulting therefrom in order to achieve cost-saving and efficient manufacturing thereof.

BRIEF SUMMARY OF THE INVENTION

In accordance with the present invention, there is provided a method of forming a resin composite part utilizing a mold surface for mitigating post-cure machining of the resin composite part. The method provides for forming a resin preform having a peripheral geometry similarly sized and configured as a configuration of the mold surface. The mold surface is sized and configured to receive the resin preform. The resin preform is then cured to form a resin composite part with the resin composite part being conformed to the configuration of the mold surface for mitigating post-cure machining of the resin composite part.

More specifically, the resin preform may be formed by cutting the preform. A template may be utilized to cut the resin preform. Such preform may be fabricated from a fiber material. Subsequent to forming the resin preform, the method may further comprise the step of selectively applying at least one ply on the resin preform such that none of the at least one ply extends beyond peripheral edges thereof. More specifically, the at least one ply may be cut such that none of the at least one ply extends beyond the peripheral edges of the preform and laid on the resin preform.

In one embodiment, the mold surface defines a recess therein and further has a mold line adjacent the recess. The recess has edges adapted to engage the resin preform therein up to the mold line, in which the edges may have a height equal to, or greater than, a thickness of the resin composite part. The edges may be non-stick edges selected from the group consisting of low expansion metals, invar, aluminum, graphite, Teflon, butyl rubber plus Teflon film and cured silicone rubber. In addition, the resin preform has an end portion, wherein the method further comprises the step of positioning the resin preform on the mold surface. Specifically, the preform end portion is extendable up to the mold line and simultaneously engages the recess.

In accordance with an embodiment of the method of the present invention, subsequent to forming the resin preform, a peel ply is laid over the resin preform. The peel ply is extendable up to the mold line. Furthermore, the mold surface defines an excess trim adjacent to the mold line, and the method further comprises the steps of laying first and second films over the peel ply, the first and second films extending to the excess trim, and positioning a dam between the first and second films adjacent to the mold line.

In addition, subsequent to forming the resin preform a flexible covering having an end may be placed over the preform and the mold surface. The end of the flexible covering is sealed to the mold surface. The flexible covering may be a vacuum bag having a vacuum attachment. Moreover, subsequent to forming the resin preform, resin may be distributed onto the resin preform.

In another embodiment, the mold surface has at least one tooling pin adapted to form at least one drilling hole on the resin composite part. The tooling pin is further adapted to form at least one countersinking hole on the resin composite part.

Further, the mold surface may be a Bond Jig. The mold surface ay be a hat mold surface having mold lines, defining a pyramidal configuration therebetween. The hat mold surface further has recesses between the pyramidal configuration and the mold lines. The resin preform having end portions is cut within 3 degrees of normal to the pyramidal configuration in intermediate area thereof, wherein the preform end portions extend up to the mold lines and simultaneously engage the recesses.

In another embodiment, the mold surface may be a generally planar mold surface, wherein the planar mold surface has a frame surrounding peripheral edges thereof. In addition, the preform may also be a generally planar preform having four sides extendable up to the frames.

Further the step of curing the resin preform may include autoclaving the resin preform to form the resin composite part. In addition, subsequent to the step of curing or autoclaving the resin composite part having edges nay have process capability ($C_p$) greater or lower than 1.33. When the process capability ($C_p$) is lower than 1.33, the method further comprises the step of sanding the edges of the resin composite part to conform to the configuration of the mold surface.

The present invention addresses and overcomes the above-described deficiency of prior art prepreg and, non-prepreg processes and a apparatus by providing a method that utilizes the mold surface to mitigate post-cures machining of the cured resin composite part. More specifically, the mold surface is sized and configured to engage a netted resin preform in its defined recess up to its mold line, thereby already configured to the configuration of the mold surface before cure. In this respect, not only does the present invention mitigate the need to use expensive post-cure machining, such as 5-axis machining for example, but it also minimizes the excess materials formed after cure.

BRIEF DESCRIPTION OF THE DRAWINGS

These as well as other features of the present invention, will become more apparent upon reference to thee drawings wherein.

DETAILED DESCRIPTION OF THE INVENTION

Figure 3:
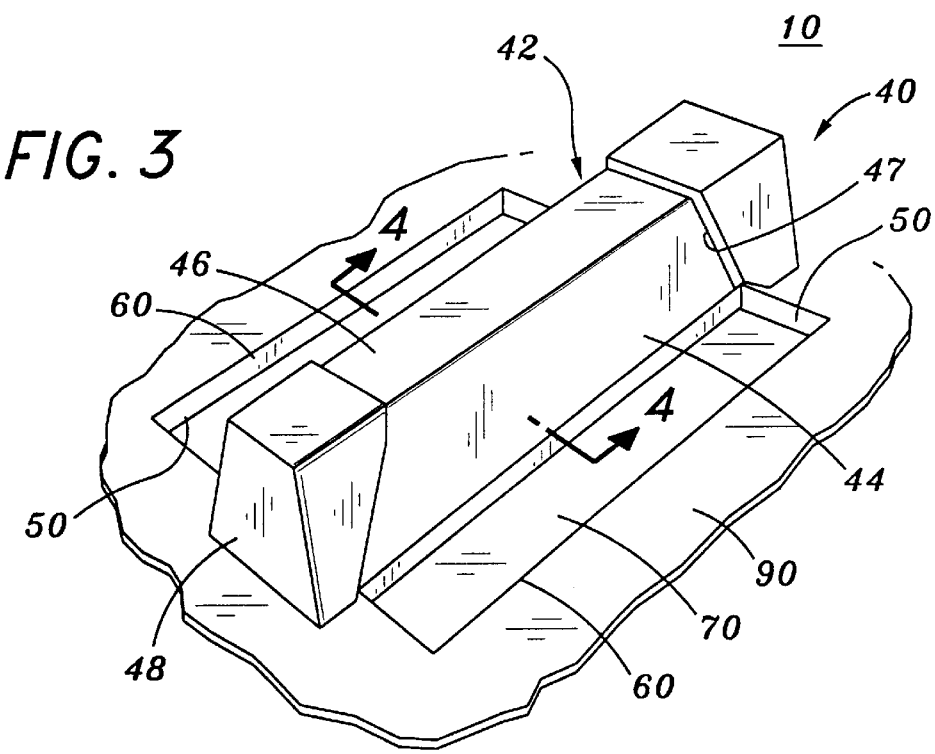
FIG. 3 is a perspective view of a hat mold surface utilized for forming a part composite part constructed in accordance wit a preferred embodiment of the present invention and defining a recess with a mold line adjacent thereto.

Referring now to the drawings wherein the showings are for purposes of illustrating preferred embodiments of the present invention only, and not for purposes of limiting the same, FIG. 3 perspectively illustrates a mold surface 10 constructed in accordance with a preferred embodiment of the present invention. The mold surface 10 is adapted to receive a resin preform 20 thereupon for forming a resin composite part 30. In this regard, the mold surface 10 may be formed to have a variety of shapes, configurations, geometries and textures in accordance with the desired shape of the resin composite part 30 formed therefrom. Such mold surface 10 may be fabricated from any material such as metal, plastic, or wood.

Figure 4:
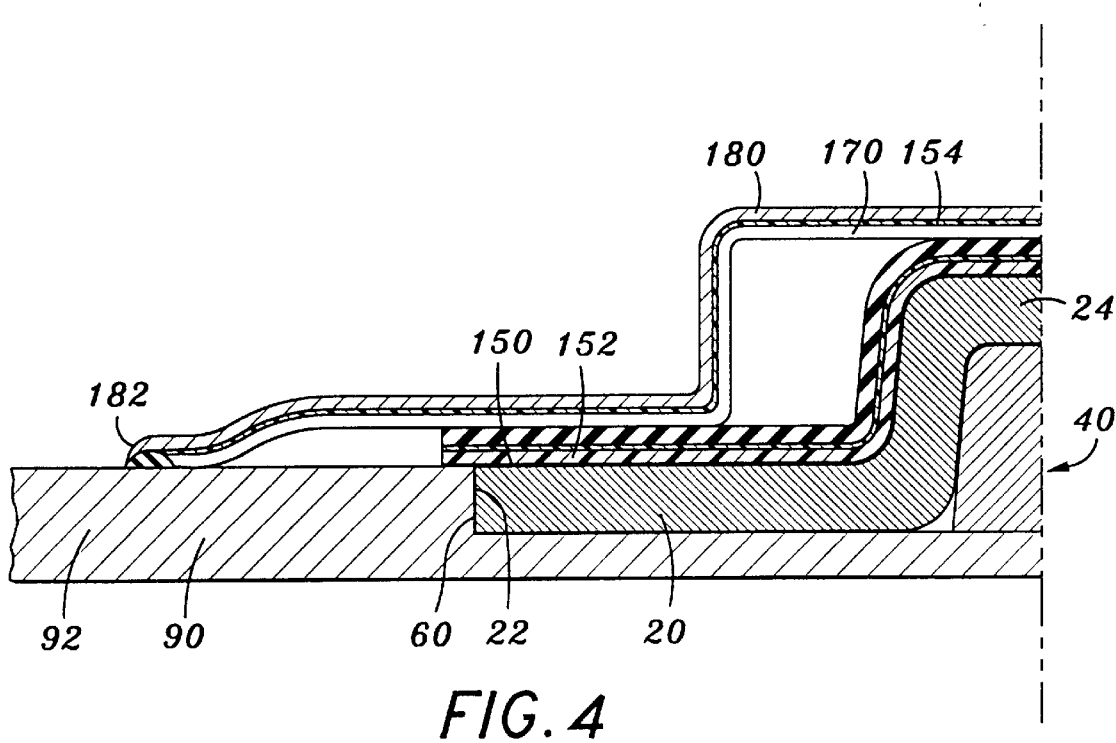
FIG. 4 is a partial dross sectional view of the hat mold surface with the resin preform thereupon as shown in FIG. 3.

Referring now to FIGS. 3 and 4 as the mold surface 10 may be any general desired shape, it is understood that thee mold surface 10 as depicted is symbolic in nature. However, the mold surface 10 is depicted as be mg a hat mold surface 40. The hat mold surface 40 is de fined by edges 50 surrounding the periphery thereof. More specifically, each of the edges 50 are perpendicularly adjoined to each other, simultaneously being in a parallel relationship to its opposing counterpart.

The hat mold surface 40 includes a pyramidal configuration 42 in the intermediate area thereof. In particular, the pyramidal configuration 42 is mounted on the center of the hat mold surface 40, linearly extending from one of the edges 50 to another. The pyramidal configuration 42 is characterized by upwardly slanted sides 44 intersecting with a plane top 46 thereon. In addition, the pyramidal configuration 42 comprises placement caps 48 surrounding the ends 47 thereof.

The pyramidal configuration 42 is between mold lines 60 of the hat mold surface 40, wherein the hat mold surface 40 further has recesses 70 between the pyramidal configuration 42 and the mold lines 60. More specifically, parallelly adjacent to each of the slanted sides 44 of the pyramidal configuration 42 are the recesses 70. The recesses 70 are contained within the boundaries of the edges 50. In other words, the edges 50 circumscribe the periphery of the recesses 70. Furthermore, the edges 50 are vertically perpendicular to the recesses 70. More specifically, a height of the edges 50 is substantially equal to, or even greater than, a thickness of the resin composite part 30. In addition, dimensions of the recesses 70 are substantially equal to the engineering specifications of the resin composite part 30 desired by manufacturers in order to produce such resin composite part 30 that is in conformity with the dimensions of the recesses 70. Therefore, such features may mitigate the need for "damming materials" such as rubber cauls and tapes, and may further reduce the possibility of resin leakage to reduce disparities of thickness of the resin composite part 30.

Moreover, the edges 50 may be non-stick edges. Such edges may be preferable because the resin composite part 30 resulting therefrom yields an acceptable dimensional process capabilities ($C_p$). The non-stick edges may be selected from the group consisting of low expansion metals, invar, aluminum, graphite, Teflon, butyl rubber plus Teflon film and cured silicone rubber.

Furthermore, the hat mold surface 40 further defines the mold lines 60. The mold lines 60 are parallel to the slanted sides 44 of the hat mold surface 40, simultaneously being adjacent to the periphery of the recesses 70 For clarification purposes, the mold lines 60 may be defined to be the edges 50 that are in parallel relation to the slanted sides 44 of the pyramidal configuration 42.

Figure 7:
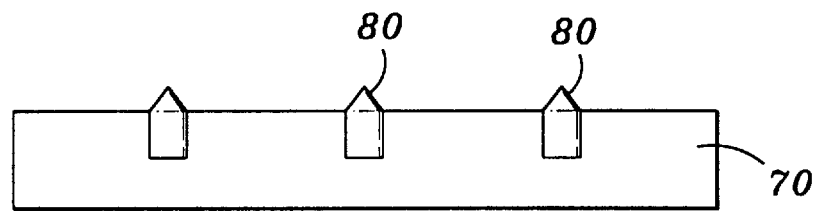
FIG. 7 is a schematic view of the recess having at least one tooling pin therein as shown in FIG. 3.
Figure 8:
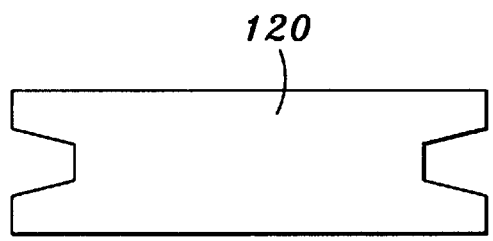
FIG. 8 is a plan view of a ply adapted to be layable on the resin preform of FIG. 3.
Figure 9:
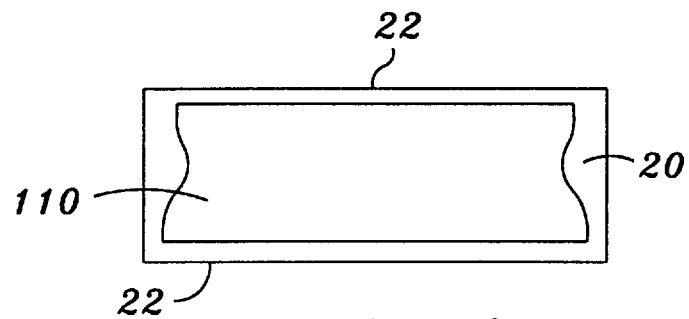
FIG. 9 is a plan view of a template utilized to cut the resin preform in correspondence to a configuration of the hat mold surface as shown in FIG. 3.

Referring now to FIGS. 3, 4 and 7, the hat mold surface 40 may further include at least one tooling pin 80 adapted to form at least one drilling hole on the resin composite part 30. In particular, the at least one tooling pin 80 may be embedded along the recesses 70 of the hat mold surface 40 to vertically protrude therefrom. Moreover, the at least one tooling pin 80 may further he positioned in any desired arrangement within the hat mold surface 40 to form at least one drilling hole on the resin composite part 30. The at least one tooling pin 80 may be fabricated from any material such as metal, wood, or plastic. Furthermore, not only is the at least one tong 80 adapted to form at least one drilling hole, the at least one tooling pin 80 may be configured to form at least one countersinking hole as well. Lastly, it will be appreciate by those of ordinary skill in the art that the at least one drilling pin 80 may be any type of fasteners, such as rivets.

In addition, the hat mold surface 40 further comprises excess trims 90. The excess trims 90 are placed adjacent to the mold lines 60, as the mold lines 60 are placed adjacent to the recesses 70. In fact, the excess trims 90 extend from the mold lines 60 to the end of the hat mold surface 40. For clarification purposes, even though the excess trims 90 are defined to be part of the hat mold surface 40, the excess trims 90 are not utilized to engage the resin preform 20 on the hat mold surface 40.

Figure 6:
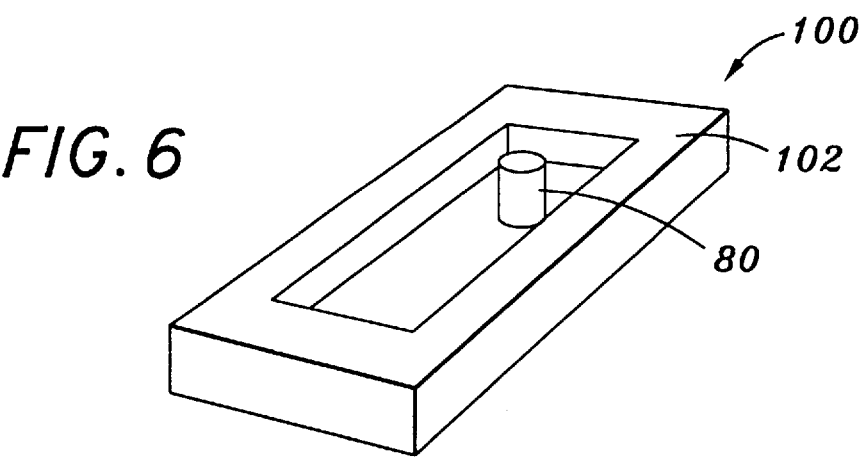
FIG. 6 is a perspective view of a generally planar mold surface with a frame surrounding peripheral edges thereof.

Referring now to FIG. 6, in addition to the mold surface 100 being the hat mold surface 40, it is contemplated that the mold surface 10 may also be a generally planar mold surface 100. The generally planar mold surface 100 has a frame 102 surrounding the peripheral edges of the generally planar mold surface 100. In other words, the frame 102 circumscribes the generally planar mold surface 100. Moreover, the frame 102 is vertically elevated compared to the generally planar mold surface 100. Such elevation may substantially equal to, or even greater than, the thickness of the resin composite part 30 resulting therefrom. Furthermore, the resin preform 20 may be a generally planar preform, in which the generally planar preform may extendably engage the generally planar mold surface up to the frame 102. Lastly, it is further contemplated that the. mold surface 10 may be a Bond Jig.

In accordance with the present invention, the mold surface 10 further comprises a method of forming the resin composite part 30 utilizing the mold surface 10 specified above in order to mitigate post-cure machining of the resin composite part 30 In particular, the hat old surface 40 will be selected to portray the method of forming such resin composite part 30. However, it is submitted that any type of mold surface 10, such as the generally planar mold surface 100 may be used in conjunction with such method as depicted below.

Referring now to FIGS. 3, 8, 9 and 11, the method of forming the resin composite part 30 according to the present invention involves the resin preform 20. The resin preform 20 may be fabricated from any material such as fiber material. Moreover, the resin preform 20 may be a prepreg or non prepreg depending on the manufacturer's choice. However, it will be recognized by those of ordinary skill in the art that if the resin perform 20 is a non prepreg, then a subsequent process of distributing resin onto the resin preform 20 is further needed. For clarification purposes, the resin preform 20 is referred to as a substance that becomes the resin composite part 30 after cure. In other words, it is the initial substance of the resin composite part 30.

In order to make the resin composite part 30 according to the present invention, the resin preform 20 may be formed to have a peripheral geometry similarly sized and configured as a configuration of the hat mold surface 40. More specifically, the resin preform 20 should be cut to yield dimensions, namely, length and width, substantially equal to that of the resin composite part 30. In addition, the resin preform 20 may be thicker than the resin composite part 30 because air may be trapped between at least one ply 120 even after debulking, as will be more fully discussed below.

The resin preform 20 may be cut 190 utilizing a template 110 to conform to the configuration of the hat mold surface 40. The template surface 110 having the peripheral geometry as that of the hat mold surface 40 may be placed upon the resin preform 20. Then, the manufacturers may cut 190 the resin preform 20 using a sharp object, such as a knife or the like, in concordance with the periphery or the template 110.

However, the manufacturers should cut the resin preform 20 such that when consolidated after cure, the resin preform 20 will yield dimensions with thickness within the desired engineering specifications. Moreover it may be further contemplated by those of ordinary skill in the art that the resin preform 20 may also be woven knitted to the desired dimensions. Thus, the resin preform 20 has a peripheral geometry to that of the mold surface 10, in this case, the hat mold surface 40.

Moreover when cutting 190 the resin preform 20, the direction of the resin composite part 30 with respect to aircraft coordinates must be noted. Also, the intermediate area 24, namely, the centerline, of the resin preform 20 must be known. In order to alleviate these questions, specific slots are located in the template 110 to mark the resin preforn 20. Furthermore, instead of the template 110. laser projectors may also be used for such purposes. The laser projectors may have the similar functionality as that of the template 110 by projecting three dimensional contoured shapes onto a flat surface. However, the software that is in operation with the laser must have sufficient accuracy for correct projection of the three dimensional curves onto the flat surface.

In particular, the resin preform 20 has end portions 22. In order for the resin preform 20 to conform to the hat mold surface 40, the intermediate area 24 of the resin preforrm 20 may be cut 190 according to the pyramidal configuration 42 of the hat mold surface 40. It is preferably, but does not have to be, for the intermediate area 24 of the resin preform 20 to be cut 190 within three degrees of normal to the pyramidal configuration 42 of the hat mold surface 40. Moreover, the end portions 22 of the resin preform 20 may further be cut 190 such that the end portions 22 are extendable up to the mold lines 60 of the hat mold surface 40, simultaneously engaging the recesses 70. However, care must be taken when cutting 190 the resin preform 20 as the quality of peripheral geometry of the resin composite part 30 resulting therefrom depends on the caliber of the cut 190.

After the resin preform 20 is formed to be similarly sized and configured to the hat mold surface 40, the manufacturers may selectively apply the at least one ply 120 on the resin preform 20. Not all the resin preform 20 must be applied with the at least one ply 120. Complex peripheral geometry of the resin preforn 20 may require the at least one ply 120. The at least one ply 120 may be applied on the resin preform 20 in any manner. However, it is preferred that none of the at least one ply 120 extends beyond the peripheral edges of the resin preforn 20.

However, as mentioned above, the thickness of the resin preform 20 may be thicker than the resin composite part 30 because the air may still be trapped between the at least one ply 120 even after debulking. It should be noted hat in the contoured mold surface 10 such as the hat mold surface 40, the end portions 22 of the resin preform 20 may be trimmed in pyramidal stackup so that the at least one ply 120 may slip during cure to yield the end portions 22 that are normal to the hat mold surface 40 after cure. The at least one ply 120 may slip to the edges 50 of the hat mold surface 40 during cure.

More specifically, the manufacturers may first cut the at least one ply 120 such that none of the at least one ply 120 extends beyond the peripheral edges of the resin preform 20. The at least one ply 120 are cut according to the debulk factor, in which the at least one ply 120 conform to the peripheral geometry of the resin preform 20. In other words, the at least one ply 120 are cut according to the specified thickness, width, and length as desired by the manufacturers such that their application would be optimal when applied to the resin preform 20. In the alternative, the at least one ply 120 may be wrapped around the peripheral edges of the resin preform 20 to be set thereunder form such that none of the at least one ply 120 extends beyond the peripheral edges thereof.

Furthermore, the at least one ply 120 may be cut individually such that they may be stacked together to provide desired thickness on the resin preform 20. However, the at least one ply 120 at the bottom of the stack has the largest dimension which substantially equals the dimension of the resin composite part 30 after cure.

For instance, the at least one ply 120 may be cut at a slight angle to normal, defined by an equation $\theta = \tan^{-1}(T\text{-}t/t)$, wherein t=thickness of the resin composite part 30 and T=thickness of the at least one ply 120 before cure. For example, for seven of that at one ply 120 comprised of woven material AS4/977-3, with t being 7×0.014=60.098 inches, the initial thickness of the resin preform would be approximately 0.11 inches per the at least one ply 120, or T=0.077 inches and $\theta$=4.1 degrees.

Figure 5:
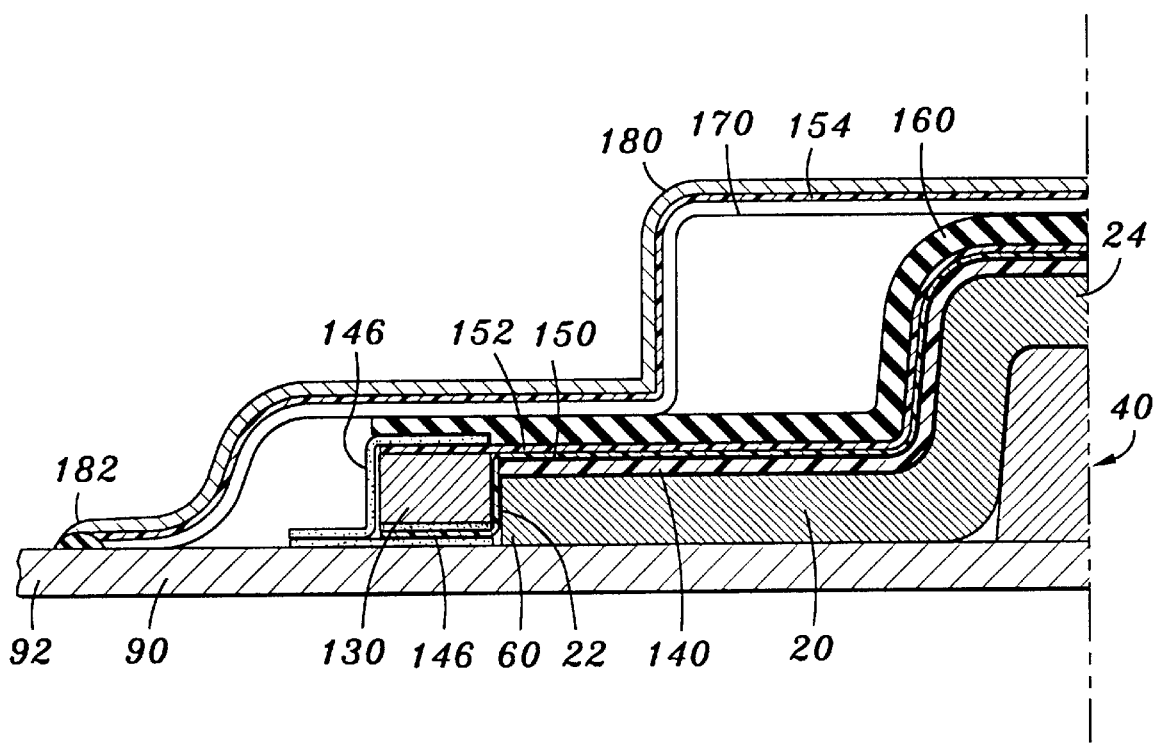
FIG. 5 is a partial cross sectional view of the hat mold surface with the resin preform thereupon and further defining a dam therewith instead of the recess.

Referring no back to FIGS. 4 and 5, several steps have to be taken before laying-up 200 the resin preform 20 onto the hat mold surface 40. The manufacturers may apply tapes 146, such as Teflon tapes, around entire periphery of the excess trims 90. In addition the hat mold surface 40 should further be heated in an oven. More specifically, the hat mold surface 40 may be heated in the oven for about 40 minutes at a temperature of about 150 degrees Fahrenheit and under vacuum. It is advised that the start and finish time of the heating be recorded.

The resin preform 20 is then laid-up 200 on the hat mold surface 40. The manufacturers have to align the centerline of resin preform 20 with that of the hat mold surface 40. The intermediate area 24 of the resin preform 20 engages the pyramidal configuration 42 of the hat mold surface 40, stays within the boundaries of the edges 50 such that thee resin preform 20 superimposes onto the pyramidal configuration 4, the recesses 70, and up to the mold lines 60 of the hat mold surface 40.

It will be recognized by the those of ordinary skill in the art that the recesses 70 may be substituted by a dam 130 placed on each of the excess trims 90 adjacent to each of the mold lines 60. The dam 130 may be positioned in place by double sided adhesives. The dam 130 may be fabricated from any material, but a butyl rubber dam is preferred. Furthermore, it should be noted that the dam 130 should not damage the resin composite part 30 when being removed at a subsequent process, even in a thermal mismatch between the hat mold surface 40 and the resin composite part 30.

Moreover, a peel ply 140 is laid over the resin preform 20, wherein the peel ply 140 is extendable up to the end portions 22 of the resin preform 20. Furthermore, a first film 150 and a second film 152 may be laid over the peel ply 140. The first and second films 150, 152 extend up to the excess trims 90 wherein the darn 130 is positioned therebetween on each of the excess trims 90. Additionally, the first and second films 150, 152 may be any types of films, but A4000 Teflon films are preferred.

The manufacturers ray apply tapes 146, such as Teflon tapes about the periphery of the dam 130. Then, a rubber caul 160 is aid over the entirely of the second film 152. Next, the manufacturers may further lay an airweave 170 over the rubber caul the airweave 170 extending to the ends 92 of the excess trims 90. Moreover, a third film 154, preferably made from A4000 Teflon film, is laid over the entirety of the airweave 170. The airweave 170 and the third film 154 are conjointly sealed at the ends 92 of the excess trims 90 to prevent resin leakage outside thereof.

In addition to the above, the manufacturers may further bag 210 the resin preform 20 and the hat mold surface 40. More specifically, the manufacturers may place a flexible covering 180 over the resin preforn 20 and the hat mold surface 40. The flexible covering 180 has flexible ends 182 that are conjointly sealed with the airweave 170 and the third film 154 at the ends 92 of the excess trims 90 to prevent resin leakage outside thereof. The flexible covering 180 may be any type of covering. However, a vacuum bag having a vacuum attachment is preferred.

Thereafter, the set-up as described above, containing the resin preform 20, is cured 220. More specifically, the above described set-up may be cured 220 at a temperature of 350 degrees Fahrenheit. Furthermore, it will be recognized by those of ordinary skill in the art that the set-up containing the resin preform 20 may be cured 220 by any standard cure conditions, however standard epoxy cure conditions are preferred. Moreover, the cure conditions may be exerted to the set-up containing the resin preform 20 for the time period recommended by the manufacturers. In the alternative, it may, further be appreciated by those of ordinary skill in the art that the set-up containing the resin preforn 20 may be autoclaved to form the resin composite part 30.

Figure 2:
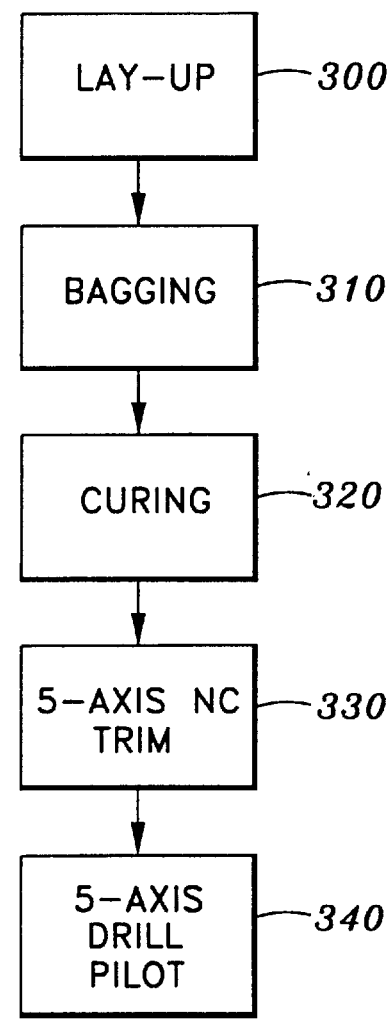
FIG. 2 is a flow diagram of a prior art process for forming the resin composite art of FIG. 1.

The methods as described above overcomes the deficiency of prior art processes. More specifically, the prior art processes, as portrayed in FIG. 2, involve laying-up 300 a preform upon a mold surface. Then, the preform and the mold surface are bagged 310 and eventually cured 320

Thereafter, the pro duct resulting therefrom is trimmed 330 to meet the engineering specifications desired by the manufacturers, such as 5-axis machining for example.

More importantly the prior art processes fail to disclose forming the preform having a peripheral geometry similarly sized and configured as a configuration of the mold surface. Specifically, the prior art processes do not disclose cutting 190 the preform to arrive to such configuration. In other words, it is submitted that the prior art proceses do not configuration the perform before it is laid-up 300 on the mold surface, unlike the present invention. The prior art processes resort to such step only after the preform is cured, in which trimming 330 is then subsequently applied.

Figure 1:
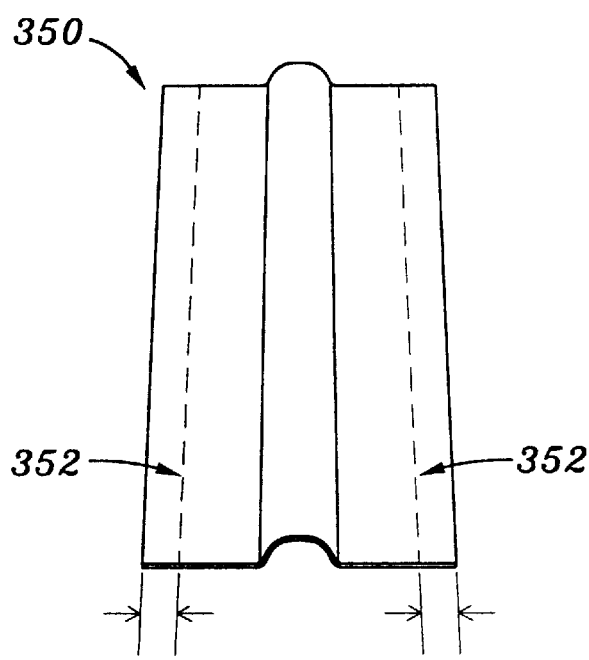
FIG. 1 is a perspective view of a prior art resin composite part before post-cure machining thereof.
Figure 10:
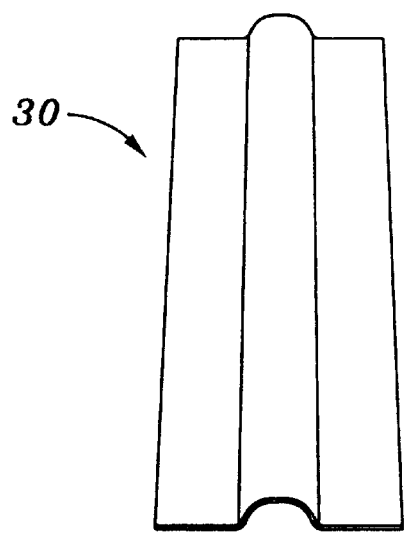
FIG. 10 is a perspective view of the resin composite part resulting from FIG. 3.
Figure 11:
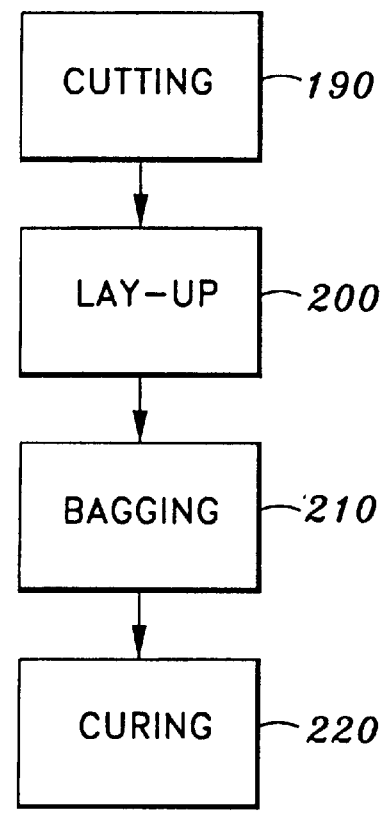
FIG. 11 is a flow diagram of a process for forming the resin composite part of FIG. 10.

Referring now to FIG. 10 in comparison with FIG. 1, the resin composite part 30 may have the process capabilities of the dimensions, width and length greater than 1.33 after cure, and may further be dependent on the engineering tolerances. When the process capabilities ($C_p$) are greater than 1.33, the resin composite part 30 may be ready for its practical application, such as being utilized as ducts for aircrafts.

It will be recognized by those of ordinary skill in the art that when the process capabilities ($C_p$) are greater than 1.33, post-cure machining of the resin composite part 30, such as 5-axis machining, is typically not needed contrary to the standard practices in existence today. More specifically, the prior art composite part 350 has to be subjected to post-cure machining of its extended ends 352 to conform with the necessary specifications, thus trimming 330 the extended ends symbolized by dotted lines in FIG. 1. However, at the disposal of the manufacturers, the resin composite part 30 may be subjected to minor preparation and detailing prior to its application. For instance, an excess of resin that protruded beyond the mold lines 60 during formation of the resin composite part 30 may be readily removed during tool breakout without the need for 5-axis.

When the resin composite part 30 has process capabilities ($C_p$) lower than 1.33, the resin composite part 30 should be subjected to minor preparation and detailing prior to its applicability. In other words, a further step is recommended after cure. More specifically, in order to comply to the desired engineering specifications, the manufacturers may further need to subject the resin composite part 30 minor preparation and detailing, such as sanding resin composite part edges 32 to conform to the configuration of the mold surface 10, namely, the hat mold surface 40.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A method of forming a resin composite part utilizing a mold surface defining an elevated surface portion thereon for mitigating post-cure machining of the resin composite part, the method comprising the steps of:

(a) forming a resin preform through projecting a three dimensional optical image thereon and cutting the resin perform according to the image to create a peripheral geometry similarly sized and configured as a configuration of the mold surface such as to accommodate the elevated surface portion of the mold surface therewithin, the resin preform further having peripheral edges accommodating the mold surface; and (b) curing the resin preform to form a resin composite part, the resin composite part being conformed to the configuration of the mold surface and the elevated surface portion thereof for mitigating post-cure machining of the resin composite part.

2. The method of claim 1 wherein the resin preform is fabricated from a fiber material.

3. The method of claim 3 wherein the mold surface defines a recess therein and further has mold line adjacent the recess.

4. The method of claim 3 wherein the recess has edges, the edges having a height substantially equal to a thickness of the resin composite part.

5. The method of claim 3 wherein the edges have a height greater than the thickness of the resin composite part.

6. The method of claim 3 wherein the resin preform has an end portion ad the method further comprises the step of positioning the resin preform on the mold surface, the preform end portion being extendable up to the mold line and simultaneously engaging the recess.

7. The method of claim 4 wherein the edges are non-stick edges.

8. The method of claim 6 wherein subsequent to step (a) the method further comprises the step of laying a peel ply over the resin preform, the peel ply being extendable up to the preform end portion.

9. The method of claim 8 wherein the mold surface defines an excess trim adjacent to the mold line, and the method further comprising the steps of:

(1) laying first and second films over the peel ply, the first and second films extending to the excess trims; and (2) positioning a dam between the first and second films adjacent to the mold line.

10. The method of claim 1 wherein subsequent to step (a) the method further comprises placing a flexible covering having an end over the preform and the mold surface, the end of the flexible covering being sealed to the mold surface.

11. The method of claim 10 wherein the flexible covering is a vacuum bag having a vacuum attachment.

12. The method of claim 1 wherein subsequent to step (a) the method further comprises distributing resin onto the resin preform.

13. The method of claim 1 wherein the mold'surface has at least one tooling pin adapted to form at least one drilling hole on the resin composite part.

14. The method of claim 13 wherein the at least one tooling pin is further adapted to form at least one countersinking hole on the resin composite part.

15. The method of claim 1 wherein the mold surface is a Bond Jig.

16. The method of claim 1 wherein the mold surface is a hat mold surface.

17. The method of claim 16, wherein the hat mold surface having mold lines defines the elevated surface portion in a form of a pyramidal configuration therebetween, the hat mold surface further having recesses between the pyramidal configuration and the mold lines.

18. The method of claim 17 wherein the resin preform having end portions is cut within 3 degrees of normal to the pyramidal configuration in intermediate area thereof, the preform end portions extending up to the mold lines and simultaneously engaging the recesses.

19. The method of claim 1 wherein the mold surface is a generally planar mold surface, the planar mold surface having a frame surrounding peripheral edges thereof.

20. The method of 19 wherein the preform is a generally planar preform, the planar preform having four sides extendable up to the frames.

21. The method of claim 1 wherein step (c) comprises autoclaving the resin preform to form the resin composite part.

22. The method of claim 1 wherein the resin composite part in step (c) has process capabilities (Cp) greater than 1.33.

23. The method of claim 1 wherein the resin composite part in step (c) has process capabilities (Cp) lower than 1.33.

24. The method of claim 23 wherein the resin composite part has edges, and step (c) further comprises sanding the edges of the resin composite part to conform to the configuration of the mold surface.

25. A method of forming a resin composite part utilizing a mold surface defining an elevated surface portion thereon, the method comprising the steps of:

(a) placing a resin preform with peripheral edges upon the mold surface, the peripheral edges accommodating the mold surface, the resin preform being formed through projecting a three-dimensional optical image thereon and cutting the resin preform according to the image to create a peripheral geometry similarly sized and configured as a configuration of the mold surface such as to accommodate the elevated surface portion of the mold surface therewithin; and (b) curing the resin preform to form a resin composite part, the resin composite part being conformed to the configuration of the mold surface and the elevated surface portion thereof.

26. The method of claim 25 wherein the resin preform is fabricated from a fiber material.

27. The method of claim 25 wherein subsequent to step (a) the method further comprises placing a flexible covering having an end over the preform and the mold surface, the end of the flexible covering being sealed to the mold surface.

28. The method of claim 27 wherein the flexible covering is a vacuum bag having a vacuum attachment.

29. The method of claim 25 wherein step (c) comprises autoclaving the resin preform to form the resin composite part.

30. A method of forming a resin composite part utilizing a mold surface defining an elevated surface portion thereon, the method comprising the steps of:

(a) placing a resin preform upon the mold surface, the resin preform being formed through projecting a three dimensional optical image thereon and cutting the resin perform according to the image to create a peripheral geometry similarly sized and configured as a configuration of the mold surface such as to accommodate the elevated surface portion of the mold surface therewithin;

(b) curing the resin preform to form a resin composite part, the resin composite part having process capabilities (Cp) lower than 1.33; and (c) detailing edges of the resin composite part in response to the Cp thereof to conform to the configuration of the mold surface and the elevated surface portion thereof.

31. The method of claim 30 wherein step (c) comprises sanding the edges of the resin composite part to conform to the configuration of the mold surface.

32. The method of claim 1 wherein subsequent to step (a) the method further comprises the step of selectively applying at least one ply on the resin preform such that none of the at least one ply extends beyond the peripheral edges thereof so as to mitigate post-cure machining of the at least one ply after cure.

33. The method of claim 25 wherein subsequent to step (a) the method further comprises the step of selectively applying at least one ply on the resin preform such that none of the at least one ply extends beyond the peripheral edges thereof so as to mitigate post-cure machining of the at least one ply after cure.

34. The method of claim 25 wherein the elevated surface portion forms a pyramidal configuration.

35. The method of claim 30 wherein the elevated surface portion forms a pyramidal configuration.

* * * * *